United States Patent
Wu et al.

(10) Patent No.: US 8,593,713 B2
(45) Date of Patent: Nov. 26, 2013

(54) INK COMPOSITION USED IN ELECTROWETTING DISPLAY DEVICE AND ELECTROWETTING DISPLAY DEVICE EMPLOYING THE SAME

(75) Inventors: Ming-Tzung Wu, Mailiao Township, Yunlin County (TW); Te-Yi Chang, Bade (TW); Chin-Hua Chang, Sanwan Township, Miaoli County (TW); Wen-Jiunn Chen, Hsinchu (TW); Yu-Chin Lin, Zhudong Township, Hsinchu County (TW); Ching-Mao Wu, Keehung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/555,542

(22) Filed: Jul. 23, 2012

(65) Prior Publication Data

US 2013/0155486 A1  Jun. 20, 2013

(30) Foreign Application Priority Data

Dec. 15, 2011  (TW) .............................. 100146407 A

(51) Int. Cl.
- *G02B 26/02* (2006.01)
- *G02B 26/00* (2006.01)
- *G02C 7/10* (2006.01)
- *C09B 47/04* (2006.01)
- *C09D 5/02* (2006.01)

(52) U.S. Cl.
USPC ........... 359/228; 359/297; 252/582; 540/143; 524/556

(58) Field of Classification Search
CPC ............ C09B 47/0675; C09B 67/0035; C09B 67/0051; C09B 67/0063; C09B 67/0069; C09D 11/322; G03G 9/09; G03G 9/0906; G03G 9/0975; G02B 26/005
USPC ........ 106/31.13, 31.8, 31.77, 31.78; 252/582; 359/228, 290, 292, 297; 430/108.23; 524/556; 540/143
See application file for complete search history.

(56) References Cited

U.S. PATENT DOCUMENTS

2003/0027071 A1  2/2003  Tazawa et al.
2005/0235874 A1  10/2005  Nakamura et al.

(Continued)

OTHER PUBLICATIONS

J.Heikenfeld et al., Electrofluidic display using Young-Laplace transposition of brillian pigment dispersions, Nature Photonics, Apr. 26, 2009, pp. 292-296, vol. 3.

(Continued)

*Primary Examiner* — David N Spector
(74) *Attorney, Agent, or Firm* — Muncy, Geissler, Olds & Lowe, PLLC

(57) ABSTRACT

Disclosed is an ink composition used in an electrowetting display device and an electrowetting display device employing the same. The ink composition used in the electrowetting display device includes a non-polar solvent and a modified hydrophobic pigment, wherein the modified hydrophobic pigment has a structure represented by Formula (I), of $$P\text{-}G_n$$

wherein P is a pigment moiety, n is 1-4 and G is

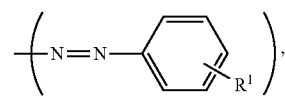

wherein $R^1$ is a straight chain or a branched $C_{4\text{-}20}$ alkyl group, or $C_{5\text{-}20}$ cycloalkyl group.

18 Claims, 1 Drawing Sheet

(56) References Cited

U.S. PATENT DOCUMENTS

| | | |
|---|---|---|
| 2009/0227785 A1 | 9/2009 | Mayo et al. |
| 2010/0179278 A1 | 7/2010 | Ma et al. |
| 2010/0251930 A1 | 10/2010 | Shakhnovich |
| 2011/0012072 A1 | 1/2011 | Luecke et al. |
| 2011/0281971 A1* | 11/2011 | Hwang et al. ............ 523/351 |
| 2013/0048197 A1* | 2/2013 | Schram et al. ............ 156/146 |
| 2013/0188238 A1* | 7/2013 | Shiga et al. .............. 359/290 |
| 2013/0222879 A1* | 8/2013 | Kuo et al. ................. 359/290 |

OTHER PUBLICATIONS

Robert A. Hayes et al., Video-speed elctronic paper based on electrowetting, Letters to Nature, Sep. 25, 2003, pp. 383-385, vol. 425.

B.J. Feenstra et al., A video-speed reflective display based on electrowetting:principle and properties, Journal of the Society for Information Display, Sep. 2004, pp. 293-299, vol. 12, Issue 3.

* cited by examiner

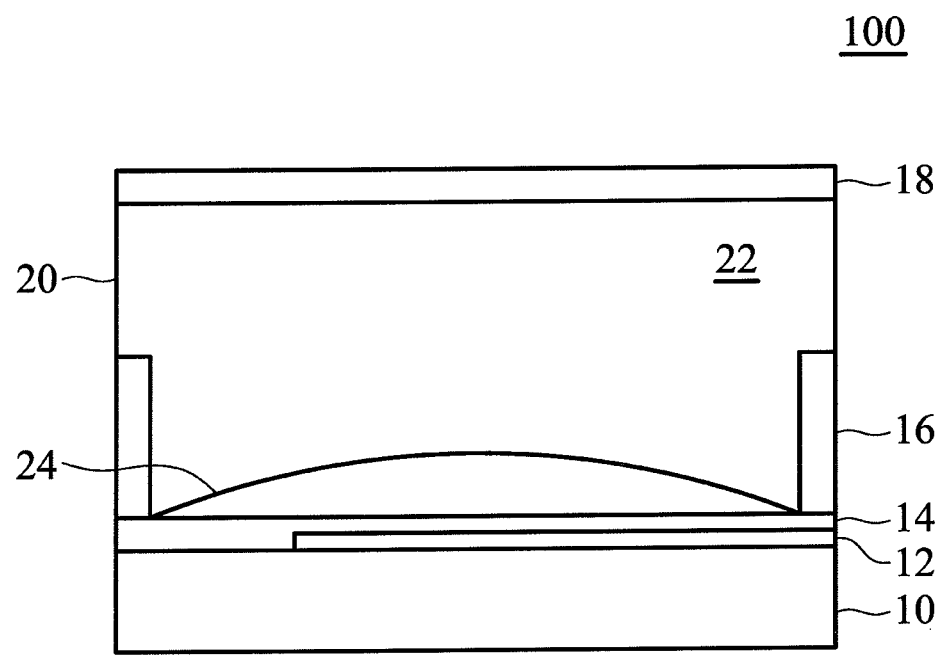

INK COMPOSITION USED IN ELECTROWETTING DISPLAY DEVICE AND ELECTROWETTING DISPLAY DEVICE EMPLOYING THE SAME

CROSS REFERENCE TO RELATED APPLICATIONS

This application is based upon and claims the benefit of priority from the prior Taiwan Patent Application No. 100146407, filed on Dec. 15, 2011, the entire contents of which are incorporated herein by reference.

TECHNICAL FIELD

The disclosure relates to an ink composition, and in particular relates to an ink composition used in electrowetting display devices.

BACKGROUND

Electrowetting display devices are rendered images in accordance with electrowetting or electrocapillary. Briefly, the free surface energy of some fluids is changed due to electric field effects such that distribution area of the fluids can thus change along with the electric field effects.

In general, the opaque ink of the electrowetting display device includes a composition having a dye. Since the outdoor operation requirements of display devices have gradually increased, the ink of the electrowetting display device must exhibit low driving voltage and high weathering resistance. The outdoor applications of the electrowetting display devices, however, are limited, due to inferior light resistance and thermal resistance of dyes.

An opaque ink including pigments for replacing the dyes has been developed. In order to ensure that electrowetting display devices can be operated under a low voltage, the pigments have to be in a nanoscale form.

The pigments with nanoscale particle sizes, however, are apt to be aggregated in accordance with the second law of thermodynamics, due to the increase of surface area and surface energy of the pigments. In order to uniformly disperse nanoscale pigments in the ink composition, the conventional ink composition has to increase the addition of a dispersant. Therefore, due to the high concentration of the dispersant, the viscosity of the ink composition is increased, resulting in a reduction in the responsiveness of the electrowetting display device.

SUMMARY

One embodiment provides an ink composition used in an electrowetting display device, including: a non-polar solvent; and a modified hydrophobic pigment, wherein the modified hydrophobic pigment has a structure represented by Formula (I)

$$P\text{-}G_n \qquad \text{Formula (I)}$$

wherein P is a pigment moiety, n is 1-4 and G is

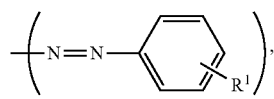, wherein $R^1$ is a straight chain or a branched $C_{4-20}$ alkyl group, or $C_{5-20}$ cycloalkyl group.

One embodiment provides an electrowetting display device, including a first substrate; a transparent electrode layer disposed on the first substrate; a dielectric layer disposed on the transparent electrode layer; a partition wall structure disposed on the dielectric layer; a second substrate disposed opposite to the first substrate, wherein a receiving space is defined between the first substrate and the second substrate; and a transparent polar solution and the aforementioned ink composition filling the receiving space.

A detailed description is given in the following embodiments with reference to the accompanying drawings.

DRAWINGS

The disclosure can be more fully understood by reading the subsequent detailed description and examples with references made to the accompanying drawings, wherein:

FIG. 1 is a cross-section view of the electrowetting display device according to an embodiment.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In one embodiment, an ink composition used in an electrowetting display device is provided, wherein the ink composition used in the electrowetting display device includes a non-polar solvent; and a modified hydrophobic pigment uniformly distributed in the non-polar solvent. Particularly, the modified hydrophobic pigment has a structure represented by Formula (I):

$$P\text{-}G_n \qquad \text{Formula (I)}$$

wherein P is a pigment moiety, n is 1-4 and G is

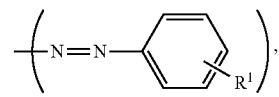, wherein $R^1$ is a straight chain or a branched $C_{4-20}$ alkyl group, or $C_{5-20}$ cycloalkyl group. For example, $R^1$ can be n-butyl group, n-hexyl group, n-octyl group, dodecyl group, tetradecyl group, or eicosyl group. In an embodiment of the disclosure, $R_1$ can be present in a weight percentage of between 0.1 to 95%, based on the molecular weight of the modified hydrophobic pigment, for example $R^1$ can be present in a weight percentage of between 0.5 to 20%, based on the molecular weight of the modified hydrophobic pigment. If $R^1$ is present in a weight percentage of less than 0.1%, the modified hydrophobic pigment would exhibit inferior dispersion stability. On the other hand, if $R^1$ is present in a weight percentage of less than 95%, the modified hydrophobic pigment would have high viscosity, resulting in a reduction of the driving voltage of the electrowetting display device.

In an embodiment of the disclosure, the modified hydrophobic pigment can be a pigment which is modified by grafting hydrophobicity groups. The method for grafting hydrophobicity groups to a pigment includes introducing an aniline moiety having a straight chain or a branched $C_{4-20}$ alkyl group, or $C_{5-20}$ cycloalkyl group into a pigment having a benzene group via a diazo coupling reaction.

For example, the method for preparing the modified hydrophobic pigment can have the following steps. First, a compound represented by Formula (II) is reacted with hydrochloric acid and sodium nitrite, producing a diazo reagent represented by Formula (III). Next, a pigment (such as a pigment with a benzene group) is dissolved in hydrochloric acid, and reacted with the diazo reagent, obtaining the modified hydrophobic pigment represented by Formula (I).

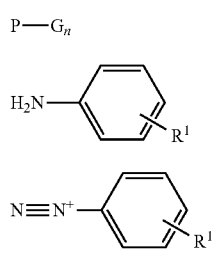

Formula (I)

Formula (II)

Formula (III)

(P is a pigment moiety, n is 1-4 and G is

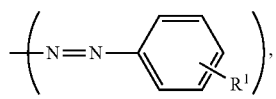

wherein $R^1$ is a straight chain or a branched $C_{4-20}$ alkyl group, or $C_{5-20}$ cycloalkyl group)

According to an alternative embodiment, the pigment including azo pigment, phthalocyanine pigment, quinacridone pigment, flavanthrone pigment, anthanthrone pigment, pyranthrone pigment, thioindigo pigment, dioxazine pigment, isoindolinone pigment, perylene tetracarboxylic acid pigment, naphthalene tetracarboxylic acid pigment, or lake pigment can be modified to form the modified hydrophobic pigment. Further, the pigment may not contain a metal element. For example: the pigment can be a red pigment, such as Pigment Red 122 (azo pigment), Pigment Red 202 (azo pigment), Pigment Red 206 (azo pigment), Pigment Red 209 (azo pigment), Pigment Red 177 (azo pigment), Pigment Red 254 (azo pigment); the pigment can be a yellow pigment, such as Pigment Yellow 13 (azo pigment), Pigment Yellow 55 (azo pigment), Pigment Yellow 119 (azo pigment), Pigment Yellow 138 (azo pigment), Pigment Yellow 139 (azo pigment), Pigment Yellow 168 (azo pigment), Pigment Yellow 150 (azo pigment); the pigment can be a green pigment, such as Pigment Green 7 (azo pigment), Pigment Green 36 (azo pigment); the pigment can be a blue pigment, such as Pigment Blue 15:3 (azo pigment), Pigment Blue 15:4 (azo pigment), Pigment Blue 15:6 (azo pigment); and the pigment can be a purple pigment, such as pigment V23 (azo pigment).

The particle size of the pigment of the ink composition can be controlled in order to provide sufficient light-shielding property. The modified hydrophobic pigment of the disclosure can have a particle size of between 1-150 nm. If the particle size of the modified hydrophobic pigment particle size is larger than 150 nm, the ink composition would have an inferior driving property. For example, the modified hydrophobic pigment can have a particle size of between 20-150 nm, in order to reduce viscosity and improve storage stability.

The method for dispersing the pigment (and reducing the particle size) can be a physical polishing treatment. For example, the powder including a pigment powder uniformly mixed with a dispersant is treated by a ball-milling process at a specific pressure for a period of time, thereby improving the dispersion of the pigment.

In the ink composition used in the electrowetting display device, the non-polar solvent can have a weight percentage of 50-99 wt %, and the modified hydrophobic pigment can have a weight percentage of 1-50 wt %, based on the weight of the non-polar solvent and the modified hydrophobic pigment. In an embodiment of the disclosure, the non-polar solvent can have a weight percentage of 75-85 wt %, and the modified hydrophobic pigment can have a weight percentage of 15-25 wt %, thereby ensuring that the ink composition exhibits a low viscosity, and a high shielding property, and a display device has a short response time.

Further, the ink composition used in the electrowetting display device can optionally include a dispersant (such as non-ionic dispersant, polymeric dispersant), thereby improving the dispersion of the modified hydrophobic pigment and the compatibility between the non-polar solvent and the modified hydrophobic pigment. It should be noted that, since the modified hydrophobic pigment of the disclosure is not apt to be aggregated, the addition of dispersant can be reduced in comparison with conventional ink compositions.

The ink composition used in the electrowetting display device can optionally include a demulsifying agent, antifoaming agent, leveling agent, or adhesive agent. Further, the ink composition of the disclosure can further include other inorganic pigments, such as carbon black, graphite, or metal oxide (such as titanium nitride, silicon dioxide, titanium dioxide, barium oxide, calcium carbide). The ink composition used in the electrowetting display device of the disclosure can have a low viscosity (of between 1-15 cps), a low surface tension (of between 20-30 mN/m), a low dielectric constant (of between 1-20), and a suitable surface charge (of between 5-30 mv).

According to an embodiment, an electrowetting display device is also provided. As shown in FIG. 1, the electrowetting display device 100 includes: a first substrate 10; a transparent electrode layer 12 disposed on the first substrate 10; a dielectric layer 14 disposed on the transparent electrode layer 12, wherein the dielectric layer 14 has hydrophobic surfaces; a partition wall structure 16 disposed on the dielectric layer 14, wherein the partition wall structure 16 has hydrophilic surfaces; a second substrate 18 disposed opposite to the first substrate 10, wherein a receiving space 20 is defined between the first substrate 10 and the second substrate 18; and, a transparent polar solution 22 (such as water) and the aforementioned ink composition 24, filling the receiving space 20.

The following examples are intended to illustrate the disclosure more fully without limiting the scope of the disclosure, since numerous modifications and variations will be apparent to those skilled in this art.

Preparation of the Modified Hydrophobic Pigment

Preparation Example 1

First, 2.04 g of 4-n-hexylaniline, 29.15 g of hydrochloric acid, and 5.0 g of sulfuric acid were added into a first reaction bottle. The mixture was stirred at 5° C., and then 0.44 g of sodium nitrite was added into the first reaction bottle. After stirring for 1 hr, a diazo reagent was obtained. Next, 2 g of Yellow Pigment Y138 and 100 g of sulfuric acid were added into a second reaction bottle (cooled in an ice water bath).

Next, the diazo reagent was added dropwisely into the second reaction bottle at 0° C. to undergo a coupling reaction. After reacting for 8 hrs, the result was added into 300 g of water. After filtration, the filter cake was washed with acetone. Finally, the filter cake was baked at 105° C. for 120 min., obtaining 1.99 g of MCLY1. The synthesis pathway was as follows:

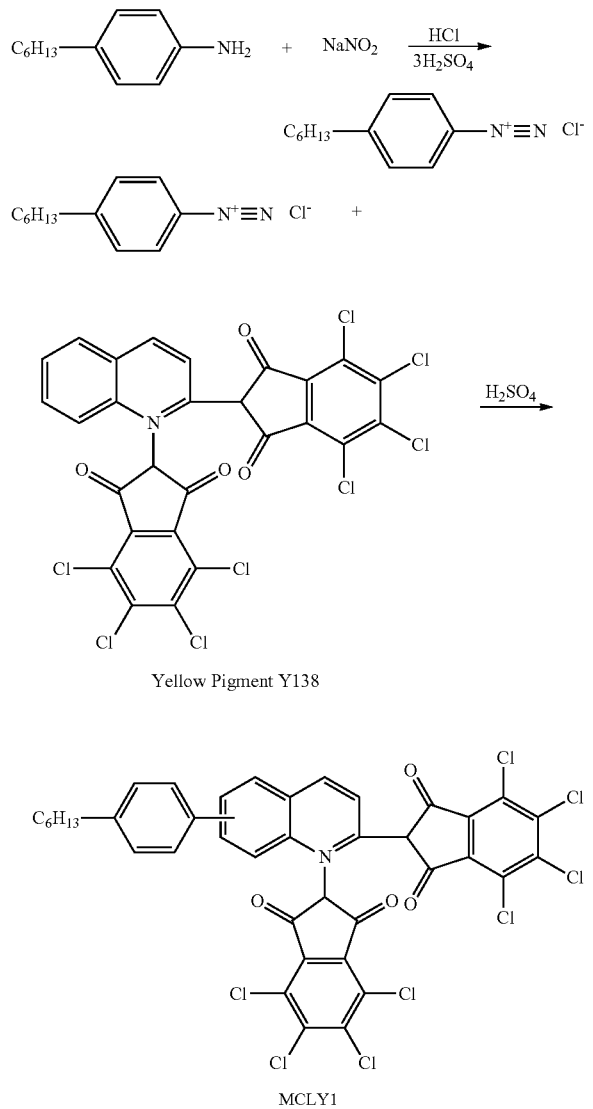

MCLY1

Preparation Example 2

First, 1.49 g of 4-dodecylaniline, 21.43 g of hydrochloric acid, and 5.0 g of sulfuric acid were added into a first reaction bottle. The mixture was stirred at 5° C., and then 0.45 g of sodium nitrite was added into the first reaction bottle. After stirring for 1 hr, a diazo reagent was obtained. Next, 1 g of Yellow Pigment Y138 and 50 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.2 g of MCLY2. The synthesis pathway was as follows:

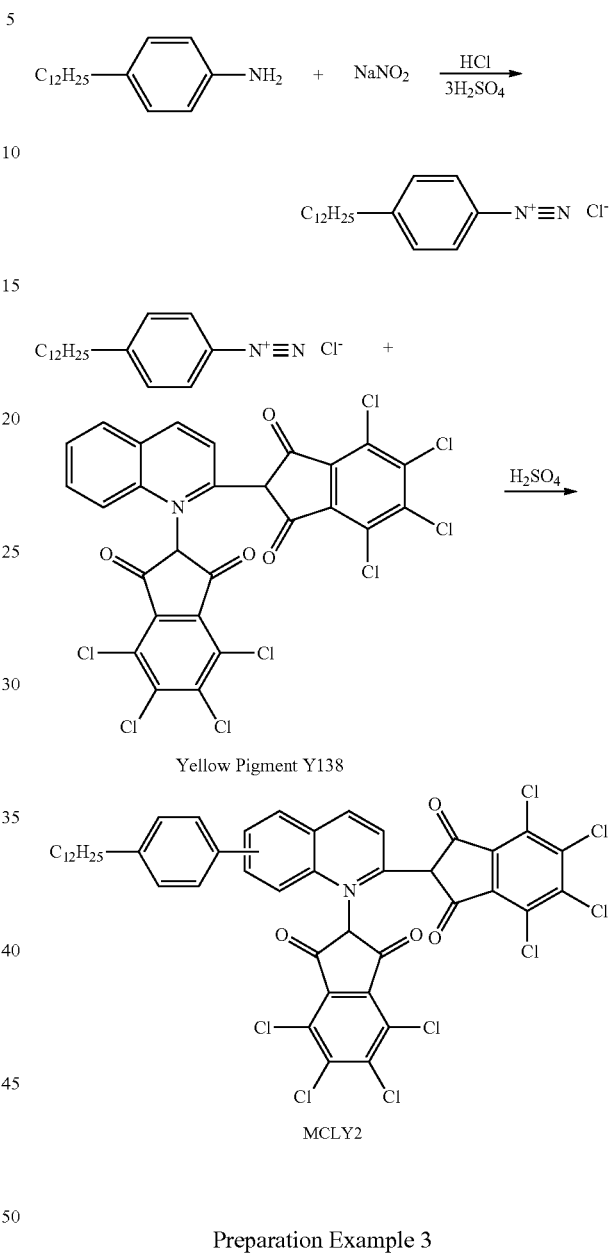

MCLY2

Preparation Example 3

First, 1.02 g of 4-n-hexylaniline, 16 g of hydrochloric acid, and 4.0 g of sulfuric acid were added into a first reaction bottle. The mixture was stirred at 5° C., and then 0.22 g of sodium nitrite was added into the first reaction bottle. After stirring for 1 hr, a diazo reagent was obtained. Next, 0.9 g of Pigment Blue 15:6 (sold and manufactured by BASF) and 30 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.1 g of MCLB1. The synthesis pathway was as follows:

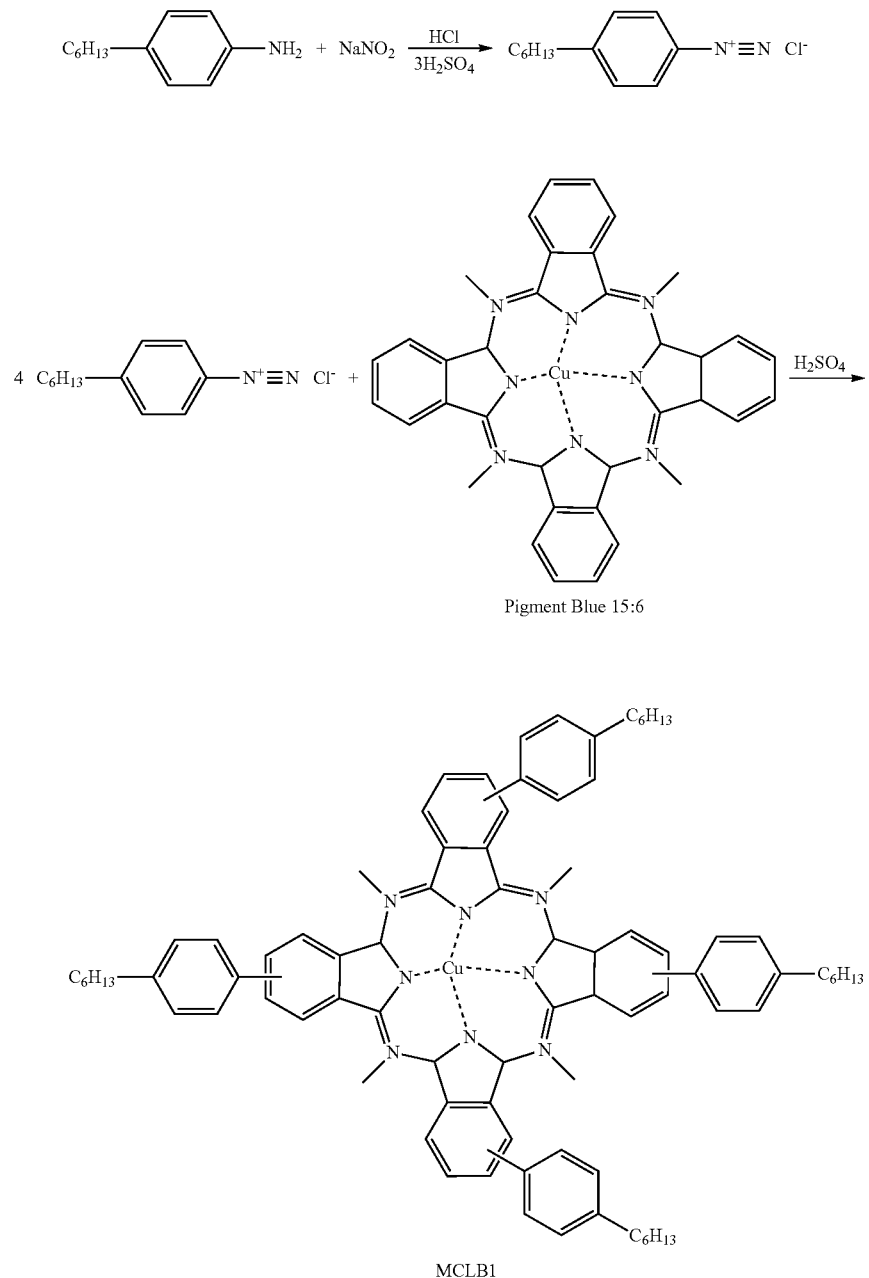

Pigment Blue 15:6

MCLB1

Preparation Example 4

First, 1.49 g of 4-dodecylaniline, 21.43 g of hydrochloric acid, and 5.0 g of sulfuric acid were added into a first reaction bottle. The mixture was stirred at 5° C., and then 0.45 g of sodium nitrite was added into the first reaction bottle. After stirring for 1 hr, a diazo reagent was obtained. Next, 0.9 g of Pigment Blue 15:6 (sold and manufactured by BASF) and 5 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 300 g of water. After filtration, the filter cake was washed with acetone. Finally, the filter cake was baked at 105° C. for 120 min., obtaining 1.05 g of MCLB2. The synthesis pathway was as follows:

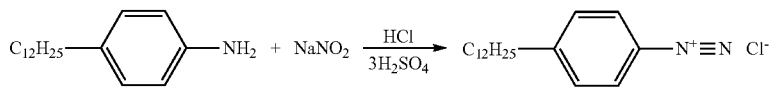

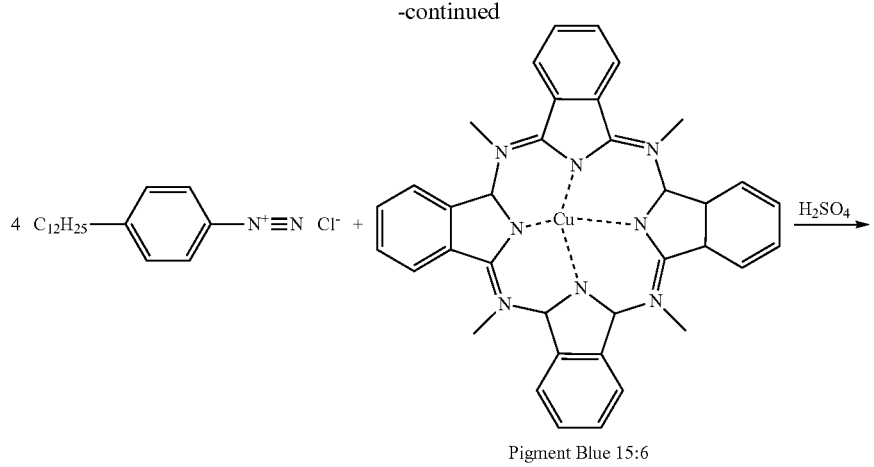

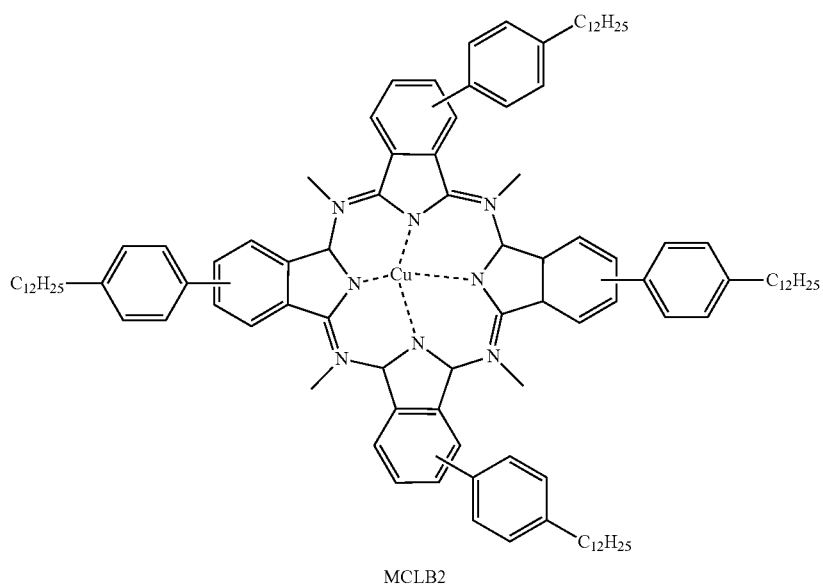

MCLB2

Preparation Example 5

First, 1.2 g of 4-n-hexylaniline, 15.04 g of hydrochloric acid, and 3.5 g of sulfuric acid were added into a first reaction bottle. The mixture was stirred at 5° C., and then 0.26 g of sodium nitrite was added into the first reaction bottle. After stirring for 1 hr, a diazo reagent was obtained. Next, 1 g of Pigment V23 and 100 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 300 g of water. After filtration, the filter cake was washed with acetone. Finally, the filter cake was baked at 105° C. for 120 min., obtaining 1.3 g of MCLV1. The synthesis pathway was as follows:

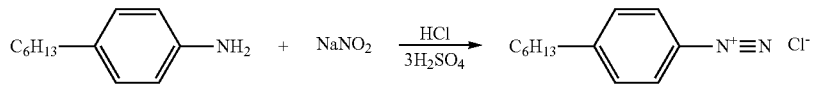

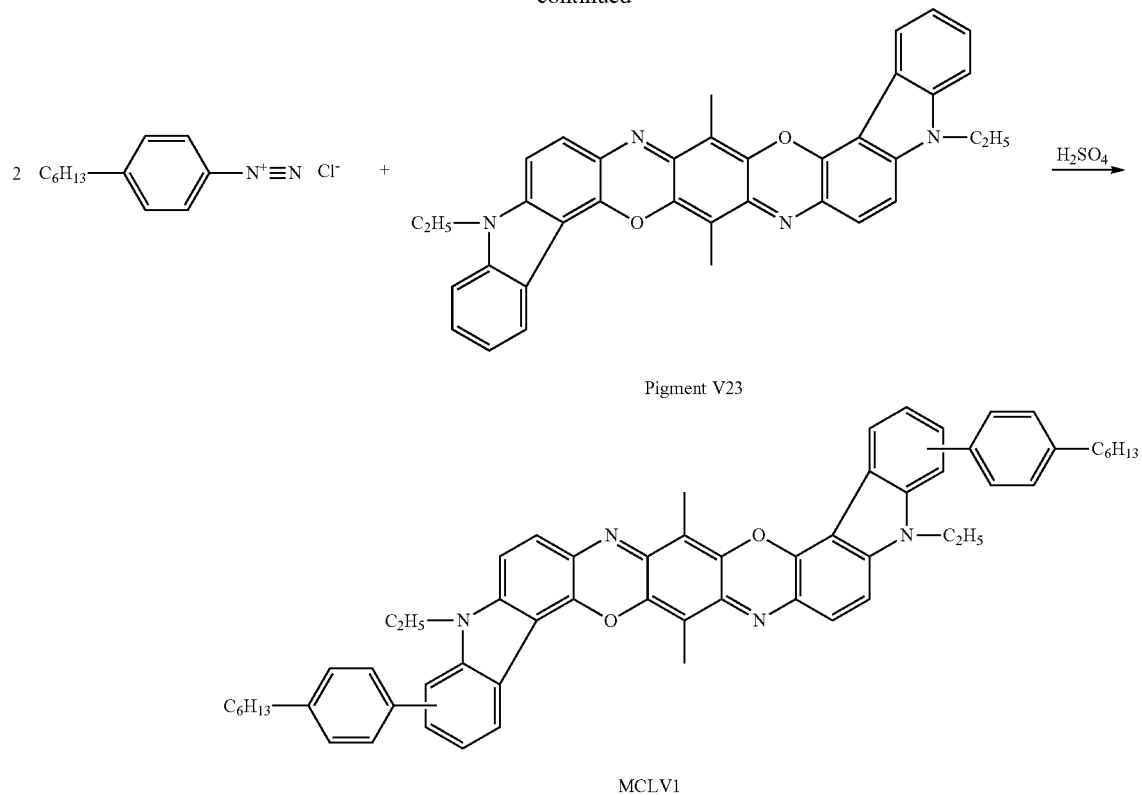

Pigment V23

MCLV1

Preparation Example 6

First, 1.49 g of 4-dodecylaniline, 21.43 g of hydrochloric acid, and 5 g of sulfuric acid were added into a first reaction bottle. The mixture was stirred at 5° C., and then 0.45 g of sodium nitrite was added into the first reaction bottle. After stirring for 1 hr, a diazo reagent was obtained. Next, 1 g of Pigment V23 and 100 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.2 g of MCLV2. The synthesis pathway was as follows:

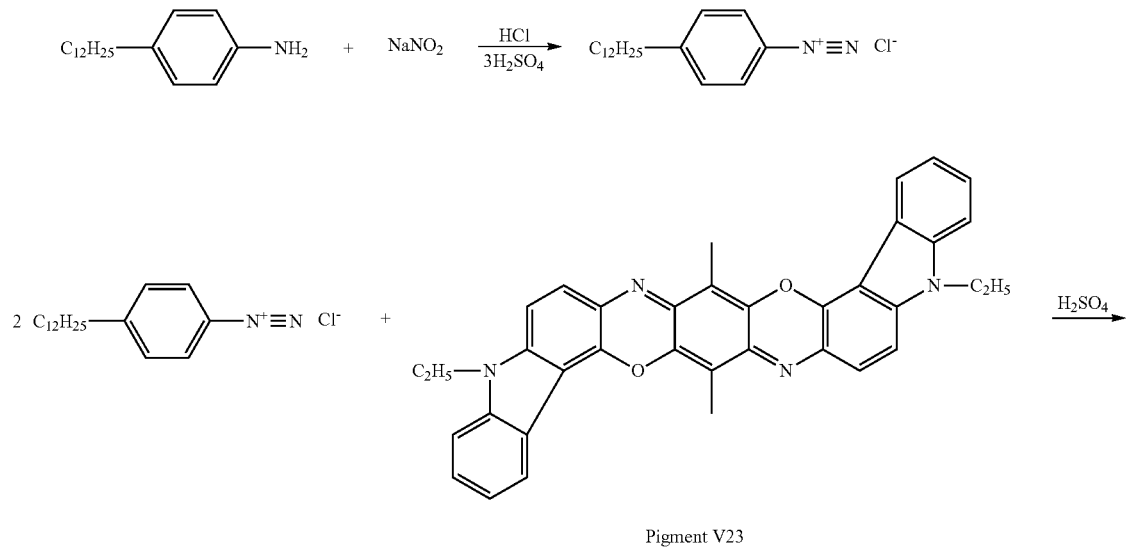

Pigment V23

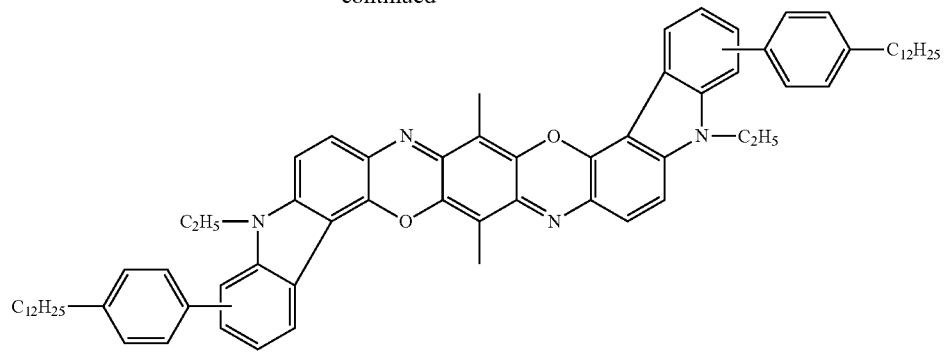

MCLV2

Preparation Example 7

First, 1.15 g of 4-n-hexylaniline, 15.8 g of hydrochloric acid, and 3.5 g of sulfuric acid were added into a first reaction bottle. The mixture was stirred at 5° C., and then 0.3 g of sodium nitrite was added into the first reaction bottle. After stirring for 1 hr, a diazo reagent was obtained. Next, 1.2 g of Pigment Red 254 and 100 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.3 g of MCLR1. The synthesis pathway was as follows:

Preparation Example 8

First, 1.48 g of 4-dodecylaniline, 22.18 g of hydrochloric acid, and 5 g of sulfuric acid were added into a first reaction bottle. The mixture was stirred at 5° C., and then 0.5 g of sodium nitrite was added into the first reaction bottle. After stirring for 1 hr, a diazo reagent was obtained. Next, 1.3 g of Pigment Red 254 and 100 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.25 g of MCLR2. The synthesis pathway was as follows:

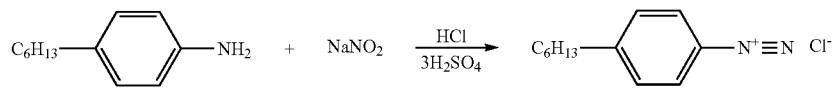

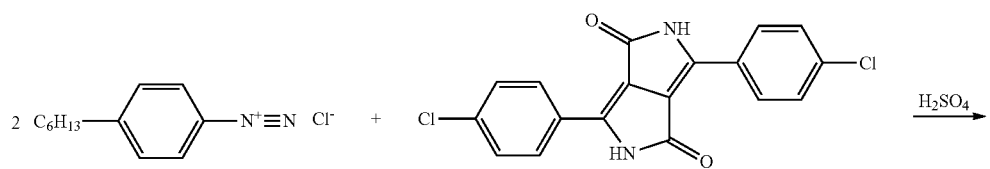

Pigment Red 254

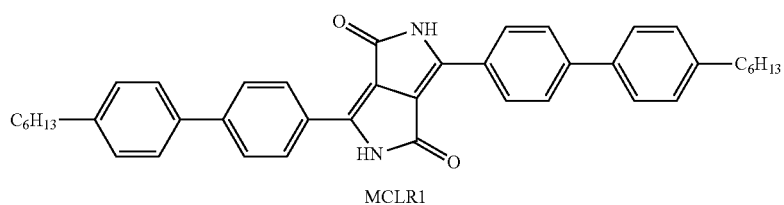

MCLR1

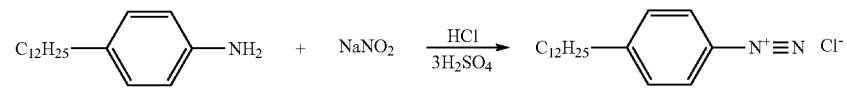

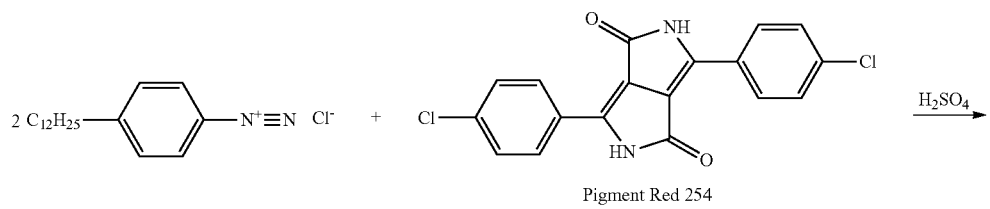

Pigment Red 254

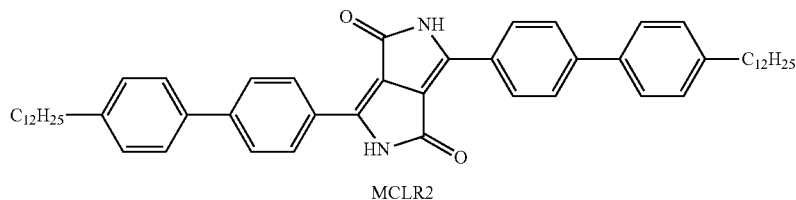

MCLR2

Preparation Example 9

First, 0.6 g of 4-n-hexylaniline, 1.48 g of hydrochloric acid, and 3.5 g of sulfuric acid were added into a first reaction bottle. The mixture was stirred at 5° C., and then 0.25 g of sodium nitrite was added into the first reaction bottle. After stirring for 1 hr, a diazo reagent was obtained. Next, 1.2 g of Pigment Green 36 (sold and manufactured by BASF) and 100 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.32 g of MCLG1. The synthesis pathway was as follows:

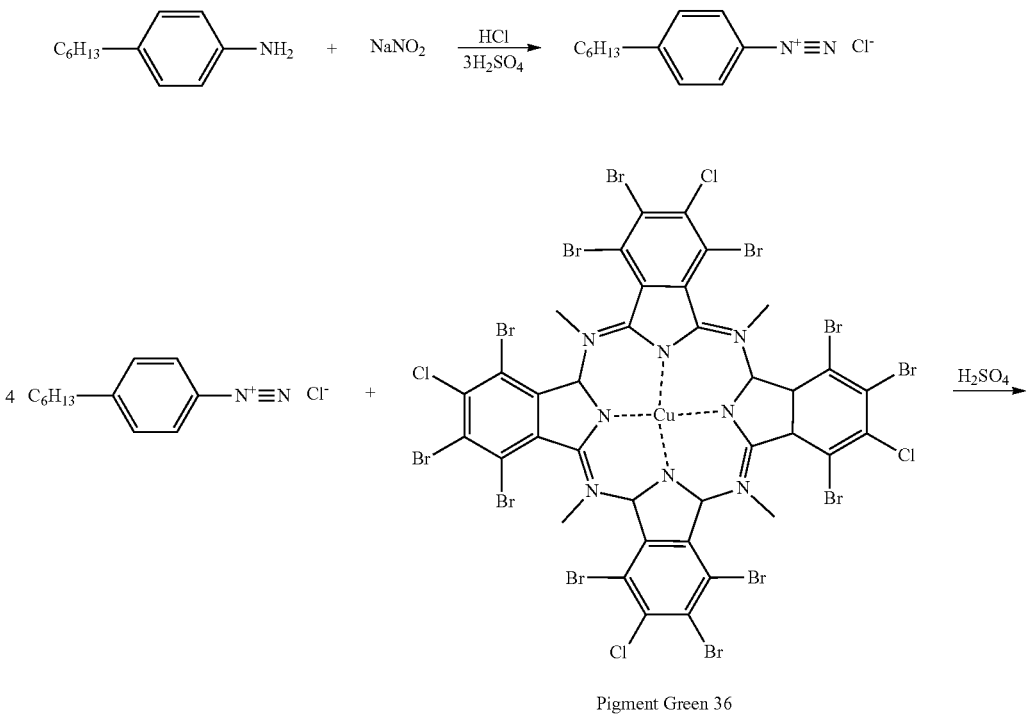

Pigment Green 36

-continued

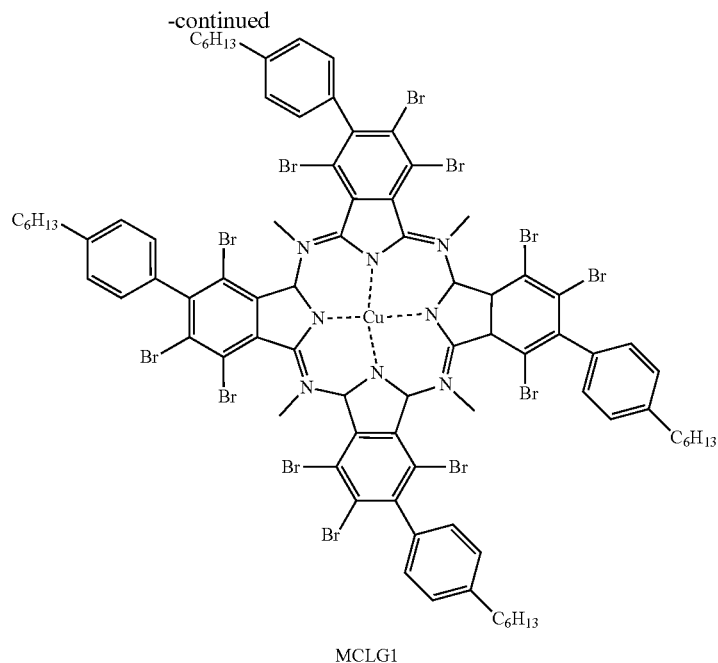

MCLG1

Preparation Example 10

First, 1.35 g of 4-dodecylaniline, 22.78 g of hydrochloric acid, and 5 g of sulfuric acid were added into a first reaction bottle. The mixture was stirred at 5° C., and then 0.45 g of sodium nitrite was added into the first reaction bottle. After stirring for 1 hr, a diazo reagent was obtained. Next, 1.2 g of Pigment Green 36 (sold and manufactured by BASF) and 100 g of sulfuric acid were added into a second reaction bottle (cooled in an ice water bath). Next, the diazo reagent was added dropwisely into the second reaction bottle at 0° C. to undergo a coupling reaction. After reacting for 8 hrs, the result was added into 200 g of water. After filtration, the filter cake was washed with acetone. Finally, the filter cake was baked at 105° C. for 120 min., obtaining 1.26 g of MCLG2. The synthesis pathway was as follows:

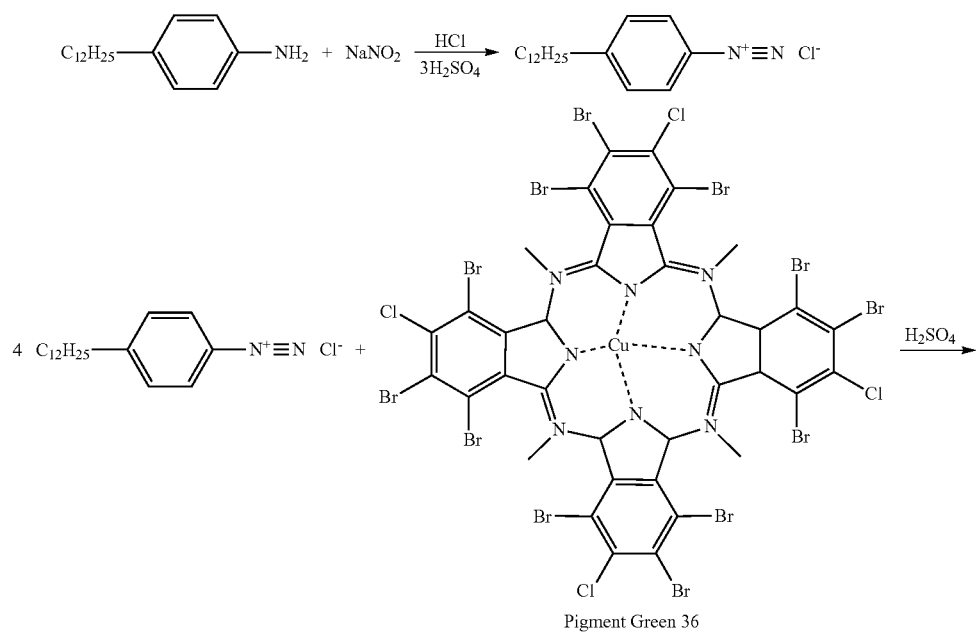

-continued

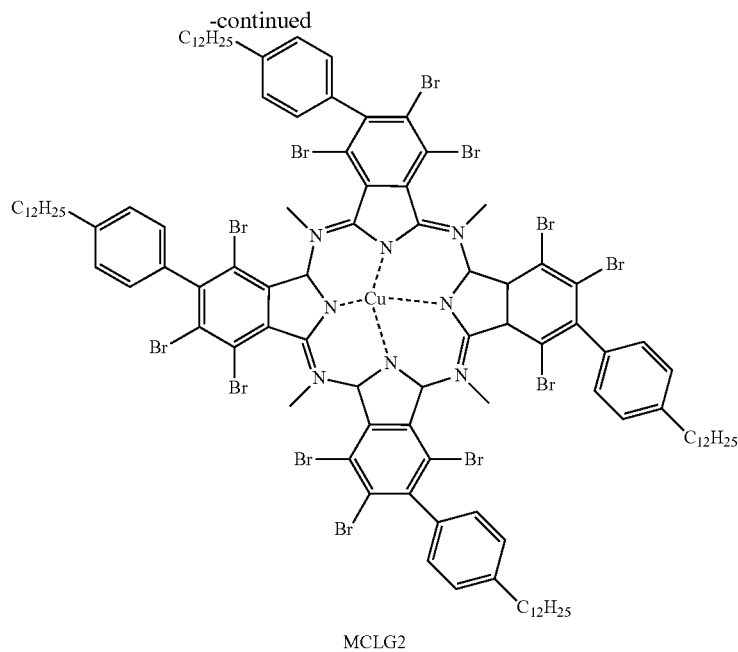

MCLG2

Preparation and Analysis of Ink Composition Used in the Electrowetting Display Device Comparative Example 1

First, 1.6 g of Pigment 8254 and 1.6 g of dispersant (Disperbyk-168) were added into a ball mill (with decane as solvent). After stirring completely, 50 g of zirconium beads were added into the mixture. After ball milling for 2 hrs, an ink composition (1) was obtained. Next, the particle size, surface tension, dielectric constant, and the driving voltage of the ink composition (1) were measured, and the results are shown in Table 1.

Comparative Example 2

First, 1.6 g of Pigment 8254 and 1.2 g of dispersant (Disperbyk-168) were added into a ball mill (with decane as solvent). After stirring completely, 50 g of zirconium beads were added into the mixture. After ball milling for 2 hrs, an ink composition (2) was obtained. Next, the particle size, surface tension, dielectric constant, and the driving voltage of the ink composition (2) were measured, and the results are shown in Table 1.

Comparative Example 3

First, 1.6 g of Pigment Green 36 (sold and manufactured by BASF) and 1.6 g of dispersant (Disperbyk-168) were added into a ball mill (with decane as solvent). After stirring completely, 50 g of zirconium beads were added into the mixture. After ball milling for 2 hrs, an ink composition (3) was obtained. Next, the particle size, surface tension, dielectric constant, and the driving voltage of the ink composition (3) were measured, and the results are shown in Table 1.

Comparative Example 4

First, 1.6 g of Pigment Green 36 (sold and manufactured by BASF) and 1.2 g of dispersant (Disperbyk-168) were added into a ball mill (with decane as solvent). After stirring completely, 50 g of zirconium beads were added into the mixture. After ball milling for 2 hrs, an ink composition (4) was obtained. Next, the particle size, surface tension, dielectric constant, and the driving voltage of the ink composition (4) were measured, and the results are shown in Table 1.

Comparative Example 5

First, 1.6 g of Pigment Blue 15:6 (sold and manufactured by BASF) and 1.6 g of dispersant (Disperbyk-168) were added into a ball mill (with decane as solvent). After stirring completely, 50 g of zirconium beads were added into the mixture. After ball milling for 2 hrs, an ink composition (5) was obtained. Next, the particle size, surface tension, dielectric constant, and the driving voltage of the ink composition (5) were measured, and the results are shown in Table 1.

Comparative Example 6

First, 1.6 g of Pigment Blue 15:6 (sold and manufactured by BASF) and 1.2 g of dispersant (Disperbyk-168) were added into a ball mill (with decane as solvent). After stirring completely, 50 g of zirconium beads were added into the mixture. After ball milling for 2 hrs, an ink composition (6) was obtained. Next, the particle size, surface tension, dielectric constant, and the driving voltage of the ink composition (6) were measured, and the results are shown in Table 1.

Comparative Example 7

First, 1.6 g of Yellow Pigment Y138 and 1.6 g of dispersant (Disperbyk-168) were added into a ball mill (with decane as solvent). After stirring completely, 50 g of zirconium beads were added into the mixture. After ball milling for 2 hrs, an ink composition (7) was obtained. Next, the particle size, surface tension, dielectric constant, and the driving voltage of the ink composition (7) were measured, and the results are shown in Table 1.

Comparative Example 8

First, 1.6 g of Yellow Pigment Y138 and 1.2 g of dispersant (Disperbyk-168) were added into a ball mill (with decane as solvent). After stirring completely, 50 g of zirconium beads were added into the mixture. After ball milling for 2 hrs, an ink composition (8) was obtained. Next, the particle size, surface tension, dielectric constant, and the driving voltage of the ink composition (8) were measured, and the results are shown in Table 1.

Comparative Example 9

First, 1.6 g of Carbon black (sold and manufactured by Mitsubishi Chemical Holdings Corp.) and 1.6 g of dispersant (Disperbyk-168) were added into a ball mill (with decane as solvent). After stirring completely, 50 g of zirconium beads were added into the mixture. After ball milling for 2 hrs, an ink composition (9) was obtained. Next, the particle size, surface tension, dielectric constant, and the driving voltage of the ink composition (9) were measured, and the results are shown in Table 1.

Comparative Example 10

First, 1.6 g of Carbon black (sold and manufactured by Mitsubishi Chemical Holdings Corp.) and 1.2 g of dispersant (Disperbyk-168) were added into a ball mill (with decane as solvent). After stirring completely, 50 g of zirconium beads were added into the mixture. After ball milling for 2 hrs, an ink composition (10) was obtained. Next, the particle size, surface tension, dielectric constant, and the driving voltage of the ink composition (10) were measured, and the results are shown in Table 1.

Example 1

First, 1.4 g of modified pigment MCLY1 (provided by Preparation Example 1) and 0.7 g of dispersant (Disperbyk-168) were added into a ball mill (with decane as solvent). After stirring completely, 50 g of zirconium beads were added into the mixture. After ball milling for 2 hrs, an ink composition (11) was obtained. Next, the particle size, surface tension, dielectric constant, and the driving voltage of the ink composition (11) were measured, and the results are shown in Table 1.

Example 2

First, 1.4 g of modified pigment MCLY2 (provided by Preparation Example 2) and 1.4 g of dispersant (Disperbyk-168) were added into a ball mill (with decane as solvent). After stirring completely, 50 g of zirconium beads were added into the mixture. After ball milling for 2 hrs, an ink composition (12) was obtained. Next, the particle size, surface tension, dielectric constant, and the driving voltage of the ink composition (12) were measured, and the results are shown in Table 1.

Example 3

First, 1.5 g of modified pigment MCLB1 (provided by Preparation Example 3) and 0.75 g of dispersant (Disperbyk-168) were added into a ball mill (with decane as solvent). After stirring completely, 50 g of zirconium beads were added into the mixture. After ball milling for 2 hrs, an ink composition (13) was obtained. Next, the particle size, surface tension, dielectric constant, and the driving voltage of the ink composition (13) were measured, and the results are shown in Table 1.

Example 4

First, 1.5 g of modified pigment MCLB2 (provided by Preparation Example 4) and 1.5 g of dispersant (Disperbyk-168) were added into a ball mill (with decane as solvent). After stirring completely, 50 g of zirconium beads were added into the mixture. After ball milling for 2 hrs, an ink composition (14) was obtained. Next, the particle size, surface tension, dielectric constant, and the driving voltage of the ink composition (14) were measured, and the results are shown in Table 1.

Example 5

First, 1.6 g of modified pigment MCLR1 (provided by Preparation Example 5) and 0.8 g of dispersant (Disperbyk-168) were added into a ball mill (with decane as solvent). After stirring completely, 50 g of zirconium beads were added into the mixture. After ball milling for 2 hrs, an ink composition (15) was obtained. Next, the particle size, surface tension, dielectric constant, and the driving voltage of the ink composition (15) were measured, and the results are shown in Table 1.

Example 6

First, 1.3 g of modified pigment MCLR2 (provided by Preparation Example 6) and 0.65 g of dispersant (Disperbyk-168) were added into a ball mill (with decane as solvent). After stirring completely, 50 g of zirconium beads were added into the mixture. After ball milling for 2 hrs, an ink composition (16) was obtained. Next, the particle size, surface tension, dielectric constant, and the driving voltage of the ink composition (16) were measured, and the results are shown in Table 1.

Example 7

First, 1.3 g of modified pigment MCLG1 (provided by Preparation Example 7) and 1.3 g of dispersant (Disperbyk-168) were added into a ball mill (with decane as solvent). After stirring completely, 50 g of zirconium beads were added into the mixture. After ball milling for 2 hrs, an ink composition (17) was obtained. Next, the particle size, surface tension, dielectric constant, and the driving voltage of the ink composition (17) were measured, and the results are shown in Table 1.

Example 8

First, 1.5 g of modified pigment MCLG2 (provided by Preparation Example 8) and 0.75 g of dispersant (Disperbyk-168) were added into a ball mill (with decane as solvent). After stirring completely, 50 g of zirconium beads were added into the mixture. After ball milling for 2 hrs, an ink composition (18) was obtained. Next, the particle size, surface tension, dielectric constant, and the driving voltage of the ink composition (18) were measured, and the results are shown in Table 1.

TABLE 1

| | pigment | viscosity (cps) | particle size (nm) | surface tension (dyne/cm) | dielectric constant | driving voltage (v) |
|---|---|---|---|---|---|---|
| Comparative Example 1 | R254 | 3.14 | 3789 | 25.2 | 2.34 | 15.2 |
| Comparative Example 2 | R254 | 4.12 | 4723 | 25.7 | 2.31 | 15.4 |
| Comparative Example 3 | G36 | 3.89 | 3594 | 25.4 | 2.28 | 16.4 |
| Comparative Example 4 | G36 | 4.56 | 4218 | 25.3 | 2.27 | 16.7 |
| Comparative Example 5 | B15:6 | 4.12 | 2987 | 25.7 | 2.19 | 20 |
| Comparative Example 6 | B15:6 | 4.78 | 3124 | 25.4 | 2.21 | 22 |
| Comparative Example 7 | Y138 | 3.14 | 2841 | 25.1 | 2.22 | 15 |
| Comparative Example 8 | Y138 | 3.97 | 3217 | 25.6 | 2.24 | 15 |
| Comparative Example 9 | carbon black | 5.12 | 3647 | 25.1 | 2.35 | 25 |
| Comparative Example 10 | carbon black | 5.67 | 4621 | 25.3 | 2.34 | 25 |
| Example 1 | MCLY1 | 1.86 | 123 | 24.5 | 2.15 | 7.4 |
| Example 2 | MCLY2 | 2.13 | 157 | 24.4 | 2.14 | 7.2 |
| Example 3 | MCLB1 | 2.13 | 132 | 23.8 | 2.13 | 7.7 |
| Example 4 | MCLB2 | 2.59 | 149 | 23.9 | 2.14 | 7.5 |
| Example 5 | MCLR1 | 1.89 | 143 | 24.3 | 2.13 | 7.5 |
| Example 6 | MCLR2 | 2.11 | 156 | 24.1 | 2.12 | 7.8 |
| Example 7 | MCLG1 | 2.01 | 148 | 25.1 | 2.14 | 7.9 |
| Example 8 | MCLG2 | 2.23 | 157 | 25.3 | 2.11 | 7.8 |

As shown in Table 1, since the modified pigment has a reduced particle size and low viscosity, the electrowetting display device employing the ink composition of the disclosure exhibits low driving voltage and short response time.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. An ink composition used in an electrowetting display device, comprising:
   a non-polar solvent; and
   a modified hydrophobic pigment having a structure represented by Formula (I)

P-G$_n$   Formula (I)

wherein P is a pigment moiety, n is 1-4 and G is

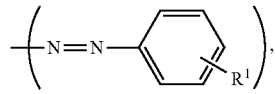

wherein $R^1$ is a straight chain or a branched $C_{4-20}$ alkyl group, or $C_{5-20}$ cycloalkyl group.

2. The ink composition used in the electrowetting display device as claimed in claim 1, wherein $R^1$ is an n-butyl group, n-hexyl group, n-octyl group, or dodecyl group, tetradecyl group, or eicosyl group.

3. The ink composition used in the electrowetting display device as claimed in claim 1, wherein $R^1$ is present in a weight percentage of between 0.1 to 95%, based on the molecular weight of the modified hydrophobic pigment.

4. The ink composition used in the electrowetting display device as claimed in claim 1, wherein $R^1$ is present in a weight percentage of between 0.5 to 20%, based on the molecular weight of the modified hydrophobic pigment.

5. The ink composition used in the electrowetting display device as claimed in claim 1, wherein the non-polar solvent has a weight percentage of 50-99 wt %, and the modified hydrophobic pigment has a weight percentage of 1-50 wt %, based on the weight of the non-polar solvent and the modified hydrophobic pigment.

6. The ink composition used in the electrowetting display device as claimed in claim 1, wherein the non-polar solvent has a weight percentage of 75-85 wt %, and the modified hydrophobic pigment has a weight percentage of 15-25 wt %, based on the weight of the non-polar solvent and the modified hydrophobic pigment.

7. The ink composition used in the electrowetting display device as claimed in claim 1, wherein the modified hydrophobic pigment has a particle size of between 1-150 nm.

8. The ink composition used in the electrowetting display device as claimed in claim 1, wherein the modified hydrophobic pigment has a particle size of between 20-150 nm.

9. The ink composition used in the electrowetting display device as claimed in claim 1, wherein the ink composition used in the electrowetting display device has a viscosity of between 1-15 cps.

10. The ink composition used in the electrowetting display device as claimed in claim 1, wherein the ink composition used in the electrowetting display device has a surface tension of between 20-30 mN/m.

11. The ink composition used in the electrowetting display device as claimed in claim 1, wherein the ink composition used in the electrowetting display device has a surface charge of between 5-30 mv.

12. The ink composition used in the electrowetting display device as claimed in claim 1, wherein the ink composition used in the electrowetting display device has a dielectric constant of between 1-20.

13. The ink composition used in the electrowetting display device as claimed in claim 1, wherein P has a benzene residual group, and G is bonded with P via the benzene residual group.

14. An electrowetting display device, comprising:
   a first substrate;
   a transparent electrode layer disposed on the first substrate;
   a dielectric layer disposed on the transparent electrode layer;
   a partition wall structure directly disposed on the dielectric layer;
   a second substrate disposed opposite to the first substrate, wherein a receiving space is defined between the first substrate and the second substrate; and
   a transparent polar solution and the ink composition used in the electrowetting display device as claimed in claim 1 filling the receiving space.

15. The ink composition used in the electrowetting display device as claimed in claim 1, wherein the modified hydrophobic pigment is a pigment having a hydrophobic group, wherein the pigment comprises azo pigment, phthalocyanine pigment, quinacridone pigment, flavanthrone pigment, anthanthrone pigment, pyranthrone pigment, thioindigo pigment, dioxazine pigment, isoindolinone pigment, perylene tetracarboxylic acid pigment, naphthalene tetracarboxylic acid pigment, or lake pigment.

16. The ink composition used in the electrowetting display device as claimed in claim 15, wherein the pigment does not contain a metal element.

17. The ink composition used in the electrowetting display device as claimed in claim 1, further comprising:
   a dispersant.

18. The ink composition used in the electrowetting display device as claimed in claim 17, further comprising:
   a demulsifying agent, antifoaming agent, leveling agent, adhesive agent, or combinations thereof.

* * * * *